(12) United States Patent  
Matsumoto

(10) Patent No.: US 9,418,359 B2  
(45) Date of Patent: Aug. 16, 2016

(54) SETTLEMENT TERMINAL DEVICE

(71) Applicant: PANASONIC INTELLECTUAL PROPERTY MANAGEMENT CO., LTD., Osaka (JP)

(72) Inventor: Manabu Matsumoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/636,418

(22) Filed: Mar. 3, 2015

(65) Prior Publication Data  
US 2015/0254621 A1    Sep. 10, 2015

(30) Foreign Application Priority Data

Mar. 6, 2014 (JP) ................................. 2014-043908

(51) Int. Cl.
| | |
|---|---|
| G06Q 20/20 | (2012.01) |
| G06F 1/28 | (2006.01) |
| G06F 1/32 | (2006.01) |
| G07F 7/08 | (2006.01) |
| G06K 7/00 | (2006.01) |
| G06K 7/01 | (2006.01) |
| G06Q 20/14 | (2012.01) |

(52) U.S. Cl.  
CPC .......... *G06Q 20/20* (2013.01); *G06F 1/28* (2013.01); *G06F 1/3212* (2013.01); *G06K 7/0004* (2013.01); *G06K 7/01* (2013.01); *G06Q 20/145* (2013.01); *G07F 7/0873* (2013.01); *Y02B 60/1292* (2013.01)

(58) Field of Classification Search  
USPC ............ 235/383, 380, 382, 379, 492; 705/24, 705/39  
See application file for complete search history.

(56) References Cited

U.S. PATENT DOCUMENTS

| 8,639,291 B1 * | 1/2014 | Gailloux | H04W 52/0274 455/407 |
|---|---|---|---|
| 2005/0268131 A1 | 12/2005 | Matsunobu | |
| 2006/0124755 A1 * | 6/2006 | Ito | G06K 19/0701 235/492 |
| 2008/0030170 A1 * | 2/2008 | Dacquay et al. | 320/137 |
| 2008/0110977 A1 * | 5/2008 | Bonalle et al. | 235/380 |
| 2009/0090783 A1 * | 4/2009 | Killian et al. | 235/492 |

(Continued)

FOREIGN PATENT DOCUMENTS

| JP | 2011-182080 | 9/2011 |
|---|---|---|
| WO | 2010/076597 | 7/2010 |

OTHER PUBLICATIONS

The Extended European Search Report from European Patent Office (EPO) dated Jul. 10, 2015 for the related European Patent Application No. 15157754.1.

*Primary Examiner* — Allyson Trail  
(74) *Attorney, Agent, or Firm* — Greenblum & Bernstein, P.L.C.

(57) ABSTRACT

A settlement terminal device of this disclosure includes a settlement processing unit that performs a settlement process and a power supply unit that supplies power stored in a battery to the settlement processing unit. The settlement processing unit detects in advance a state where a battery residual capacity is equal to or less than a predetermined value when performing the settlement process, and sets a first detection threshold value for a first settlement mode requiring a first power consumption level which is greater than a second detection threshold value for a second settlement mode requiring a second power consumption level which is lower than the first power consumption level.

20 Claims, 11 Drawing Sheets

(56) References Cited

U.S. PATENT DOCUMENTS

| | | | |
|---|---|---|---|
| 2009/0281949 A1* | 11/2009 | Coppinger | 705/50 |
| 2010/0051685 A1* | 3/2010 | Royyuru et al. | 235/379 |
| 2011/0291705 A1* | 12/2011 | Fukami | 327/80 |
| 2012/0028575 A1* | 2/2012 | Chen | G06K 19/0705 455/41.1 |
| 2012/0080529 A1* | 4/2012 | Al-Kadi et al. | 235/492 |
| 2012/0191612 A1* | 7/2012 | Spodak et al. | 705/65 |
| 2013/0013490 A1* | 1/2013 | Keller | G06Q 20/3226 705/39 |
| 2013/0345884 A1* | 12/2013 | Forbes, Jr. | 700/286 |
| 2014/0032346 A1* | 1/2014 | Hong et al. | 705/18 |
| 2014/0040120 A1* | 2/2014 | Cho | G06Q 20/3278 705/39 |
| 2014/0065948 A1* | 3/2014 | Huang | 455/7 |
| 2014/0104635 A1* | 4/2014 | Nishikawa | H04N 1/00238 358/1.14 |
| 2014/0333324 A1* | 11/2014 | Kabler et al. | 324/537 |
| 2015/0134510 A1* | 5/2015 | O'Donoghue | 705/39 |
| 2015/0142653 A1* | 5/2015 | Neumann et al. | 705/44 |
| 2015/0149311 A1* | 5/2015 | Ward et al. | 705/24 |

* cited by examiner

SETTLEMENT TERMINAL DEVICE

BACKGROUND OF THE INVENTION

1. Field of the Invention

The present invention relates to a settlement terminal device which is used in order to perform settlement or a commercial transaction.

2. Description of the Related Art

In a credit transaction using a credit card or the like, the security of the transaction is secured by verifying whether or not a person performing the transaction is the same person as the owner of the credit card used for the transaction (identity verification). The identity verification is performed by a customer signing a transaction slip, having transaction details printed thereon, which is output during a transaction process and by a store clerk visually comparing the signature and a signature written on the credit card.

In recent years, such a settlement terminal device capable of inputting and displaying a signature has been realized in the form of an information processing terminal such as a smartphone or a tablet terminal. A large number of such information processing terminals are being distributed for customer use, and thus it is possible to construct the settlement terminal devices by supplying the information processing terminals at low prices.

An information processing terminal is operated using a battery built into the terminal as a power supply. For this reason, when the information processing terminal is used as a settlement terminal device, the terminal is required to be driven for a long period of time using power supplied from the battery. In addition, it is necessary to perform battery management for preventing battery exhaustion during a settlement process.

For example, Japanese Patent Unexamined Publication No. 2011-182080 discloses a technique that achieves power saving by preventing unnecessary radio waves from being output when performing short-range wireless communication with an RF tag and prevents battery exhaustion from occurring, as an example of a portable terminal.

As cards used for settlement, non-contact IC cards have started to be distributed in addition to magnetic cards which have been mainly used so far and contact IC cards which are newer than the magnetic cards. Settlement using non-contact IC cards which are replacing magnetic cards and contact IC cards is expected to increase from now on. In addition, devices capable of supporting three types of a magnetic card, a contact IC card, and a non-contact IC card are required.

When a settlement terminal device capable of supporting a plurality of types of cards is constituted by an information processing terminal, power consumption is different depending on the type of a card to be read. For example, there is a large difference in power consumption at the time of reading between a non-contact IC card and a magnetic card. In addition, power consumption is different depending on a settlement method such as the presence or absence of receipt printing or the necessity of external communication. Accordingly, when the settlement terminal device is used, a consumption speed of a battery power storage amount is different depending on various types of settlement mode mentioned above, and thus an appropriate battery management that does not hinder a settlement process is required. For example, if the power saving technique disclosed in Japanese Patent Unexamined Publication No. 2011-182080 is used, a case is assumed in which battery management is difficult such as a case where a difference in power consumption is large depending on a settlement mode.

SUMMARY OF THE INVENTION

A settlement terminal device of this disclosure includes a settlement processing unit that performs a settlement process and a power supply unit that supplies power stored in a battery to the settlement processing unit. The settlement processing unit detects in advance a state where a battery residual capacity is equal to or less than a predetermined value when performing the settlement process, and sets a first detection threshold value for a first settlement mode requiring a first power consumption level which is greater than a second detection threshold value for a second settlement mode requiring a second power consumption level which is lower than the first power consumption level.

BRIEF DESCRIPTION OF DRAWINGS

FIG. 1A is a front view showing the exterior of the settlement terminal device, and FIG. 1B is a side view showing the exterior of the settlement terminal device;

DETAILED DESCRIPTION OF THE PREFERRED EMBODIMENTS

Hereinafter, settlement terminal devices according to embodiments of the present invention will be described with reference to the accompanying drawings.

A settlement terminal device of this exemplary embodiment is an example of a configuration that realizes an information processing apparatus and an information processing method according to the present invention.

Figure 1A:
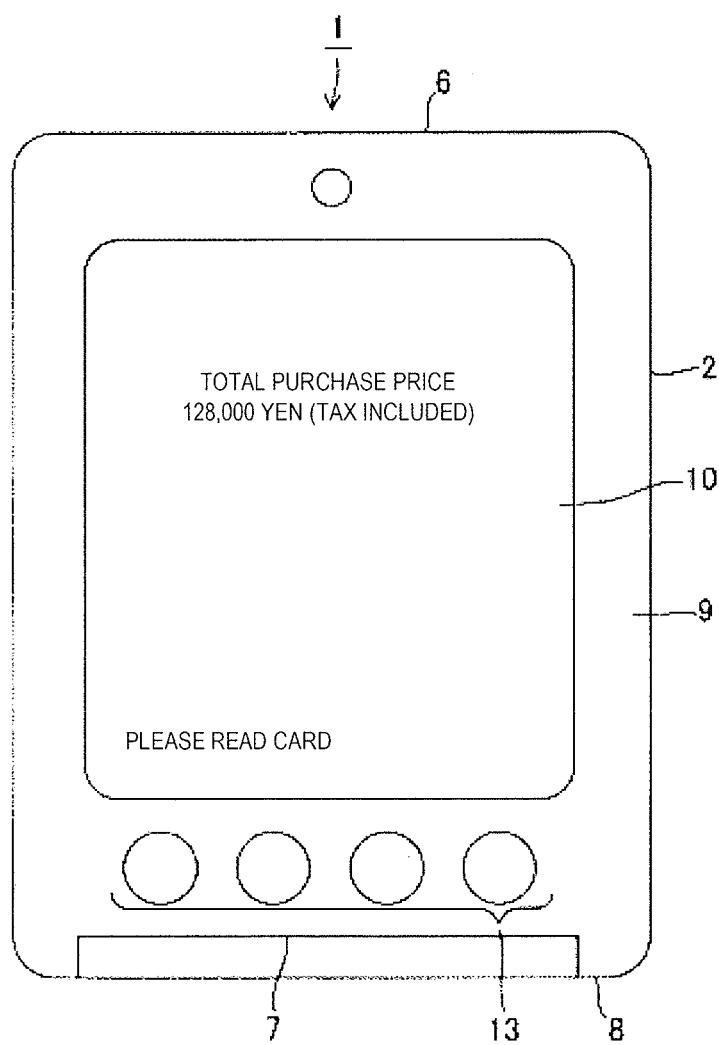
FIGS. 1A and 1B are plan views showing the exterior configuration of a settlement terminal device according to this exemplary embodiment.
Figure 1B:
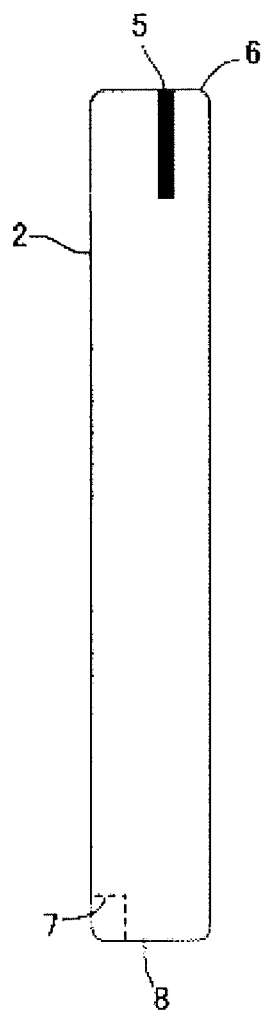

FIGS. 1A and 1B are plan views showing the exterior configuration of a settlement terminal device according to this exemplary embodiment. FIG. 1A is a front view showing the exterior of the settlement terminal device, and FIG. 1B is a side view showing the exterior of the settlement terminal device. Settlement terminal device 1 of this exemplary embodiment, which is a portable type, includes information processing unit 2 that performs various types of information processing including a settlement process.

Settlement terminal device 1 shown in FIGS. 1A and 1B includes slit 5 serving as a path for sliding a magnetic card and reading the magnetic card in one side surface (upper side surface, a side surface on the upper side in FIGS. 1A and 1B) 6 of information processing unit 2. In addition, settlement terminal device 1 includes insertion port 7 for reading a contact IC card in side surface (lower side surface, a side surface on the lower side in FIGS. 1A and 1B) 8 on the opposite side to side surface 6 of information processing unit 2. Further, settlement terminal device 1 includes loop antenna 39 for reading a non-contact IC card inside the device.

In addition, settlement terminal device 1 includes touch panel 10 functioning as an input and display unit on front face 9 of information processing unit 2. Further, settlement terminal device 1 includes keys 13 as input units outside (lower side in the drawing) one side of touch panel 10 on front face 9.

Figure 2:
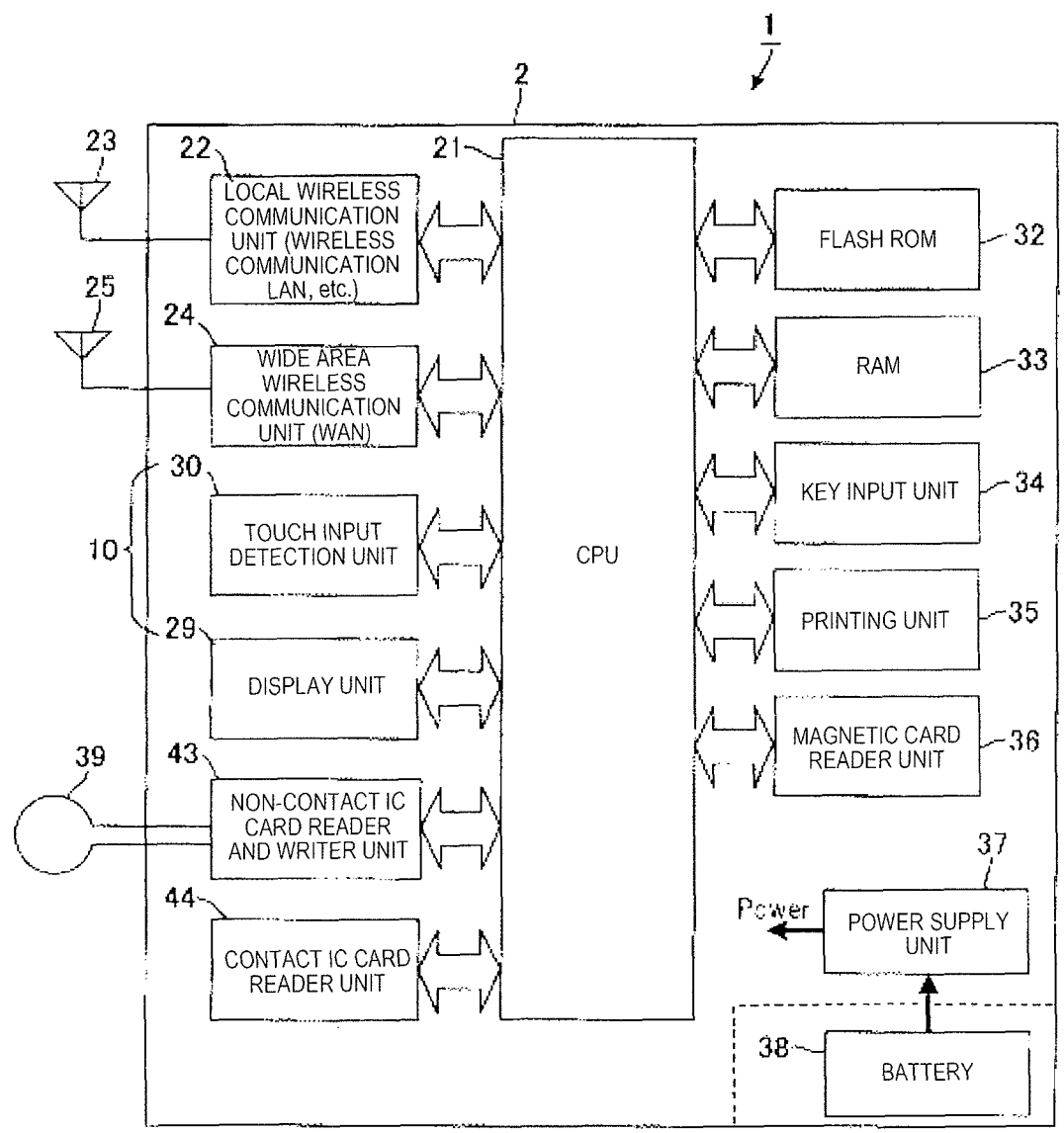
FIG. 2 is a block diagram showing a hardware configuration of the settlement terminal device according to this exemplary embodiment.

FIG. 2 is a block diagram showing a hardware configuration of the settlement terminal device according to this exemplary embodiment. Information processing unit 2 of settlement terminal device 1 includes CPU 21 that performs processing of each unit. In addition, various types of components are connected to CPU 21. Local wireless communication unit 22 is connected to local wireless communication antenna 23 and has a function of performing, for example, wireless LAN communication using a local wireless communication path not shown in the drawing. The local wireless communication is not limited to a wireless LAN, and may be Bluetooth (registered trademark) or the like. Wide area wireless communication unit 24 is connected to wide area wireless communication antenna 25 and has a function of performing wide area wireless communication using a wide area wireless communication path (WAN) not shown in the drawing. The wide area wireless communication can use communication using a mobile phone line such as, for example, W-CDMA, UMTS, CDMA2000, or LTE.

Display unit 29 has a function of controlling a display of touch panel 10 (see FIGS. 1A and 1B). Touch input detection unit 30 has a function of detecting a touch input on touch panel 10.

Flash ROM 32 has a function of storing various types of data. The stored data may be data regarding business affairs or may be a program for controlling settlement terminal device 1 (mainly, information processing unit 2). The program includes various types of programs related to the operation of settlement terminal device 1 such as application software for settlement. Accordingly, flash ROM 32 has a function as a storage medium that records a program.

RAM 33 is a memory which is used in order to temporarily store processing data generated during a computation process or the like which is associated with the operation of settlement terminal device 1 (mainly, information processing unit 2). Key input unit 34 has a function of receiving a key input from keys 13 shown in FIGS. 1A and 1B. Printing unit 35 has a function of printing a receipt indicating information such as settlement details.

Magnetic card reader unit 36 is disposed inside slit 5 in FIGS. 1A and 1B and has a function of reading a magnetic stripe of a magnetic card.

A non-contact IC card reader and writer unit 43 is connected to loop antenna 39 and has a function of reading a non-contact IC card.

Contact IC card reader unit 44 has a function of reading card information from an electrode of a non-contact IC card inserted into insertion port 7 (see FIGS. 1A and 1B).

Power supply unit 37, which is mainly a power supply of information processing unit 2, is supplied with power stored in battery 38 and supplies power to each unit of information processing unit 2, including CPU 21. CPU 21 can supply power or stop supplying power to some or all of the circuits constituting information processing unit 2 by controlling power supply unit 37. Power supply destinations of power supply unit 37 include various types of components such as local wireless communication unit 22, wide area wireless communication unit 24, display unit 29, touch input detection unit 30, non-contact IC card reader and writer unit 43, contact IC card reader unit 44, key input unit 34, printing unit 35, and magnetic card reader unit 36 in addition to information processing unit 2. In addition, power supply unit 37 may have a function of charging battery 38 from an external power supply.

Settlement terminal device 1 having the above-mentioned functions has the following characteristics.

In this exemplary embodiment, information processing unit 2 includes touch panel 10 (see FIGS. 1A and 1B to FIG. 3) which includes both display unit 29 and touch input detection unit 30 ("input unit" in the present invention). In addition, information processing unit 2 includes wide area wireless communication unit 24 or local wireless communication unit 22 ("external input/output interface" in the present invention) which is capable of communicating with the outside (for example, a settlement center).

Settlement schemes have diversified by a contact IC card, a non-contact IC card, and electronic money being added to a magnetic card which has been used hitherto for card settlement. In association with the addition of new settlement schemes, the development cost and price of settlement terminal device 1 are increasing. When a large number of such information processing units 2 are information processing terminals, such as a smartphone and a tablet terminal, which are being distributed for customer use, the terminals can be supplied at low prices. Thereby, increases in the development cost and price of settlement terminal device 1 are minimized.

In this case, a general-purpose operating system (OS) is adopted as a software platform in information processing unit 2. Therefore, since development platforms of application software (hereinafter, "settlement application") for settlement and application software (hereinafter, "business application") which is used for other business affairs are used for various purposes the reuse and recycling of development assets are facilitated. Further, information processing unit 2 using such an information processing terminal for customer use has such a high computation processing ability that a video can be recorded and played back without stress, and thus it is possible to flexibly execute the settlement application and other business applications without stress.

In this exemplary embodiment, a battery management operation is changed in information processing unit 2 in response to a plurality of settlement modes, such as the type of a card used for settlement, the presence or absence of receipt printing, and the necessity of external communication, which have various different power consumption levels. In a case of a non-contact IC card, an induction field or wireless waves for non-contact communication are output to the card by using non-contact IC card reader and writer unit 43, and thus large power consumption is required in a settlement process. In addition, when a receipt indicating information such as settlement details is printed during a settlement process, large power consumption is required in order to drive printing unit 35. In a case of an online settlement in which communication with an external settlement center or the like is performed, wireless communication is performed using wide area wireless communication unit 24 or local wireless communication unit 22, the operation needs to be reliably performed until the settlement process is completed, and thus large power consumption is required.

Information processing unit 2 detects in advance a state where a battery residual capacity is equal to or less than a predetermined value when performing a settlement process, and performs the settlement process before battery exhaustion occurs. At this time, in a case of a settlement mode, such as settlement using a non-contact IC card, which requires large power consumption, information processing unit 2 sets a high detection threshold value of the battery residual capacity and detects that the battery residual capacity is lower than a required capacity early, as compared with a case of a settlement mode that does not require large power consumption. Thereby, even in a case where large power consumption is required during a settlement process, it is possible to perform an appropriate battery management and to reliably perform the settlement process.

First Exemplary Embodiment

Figure 3:
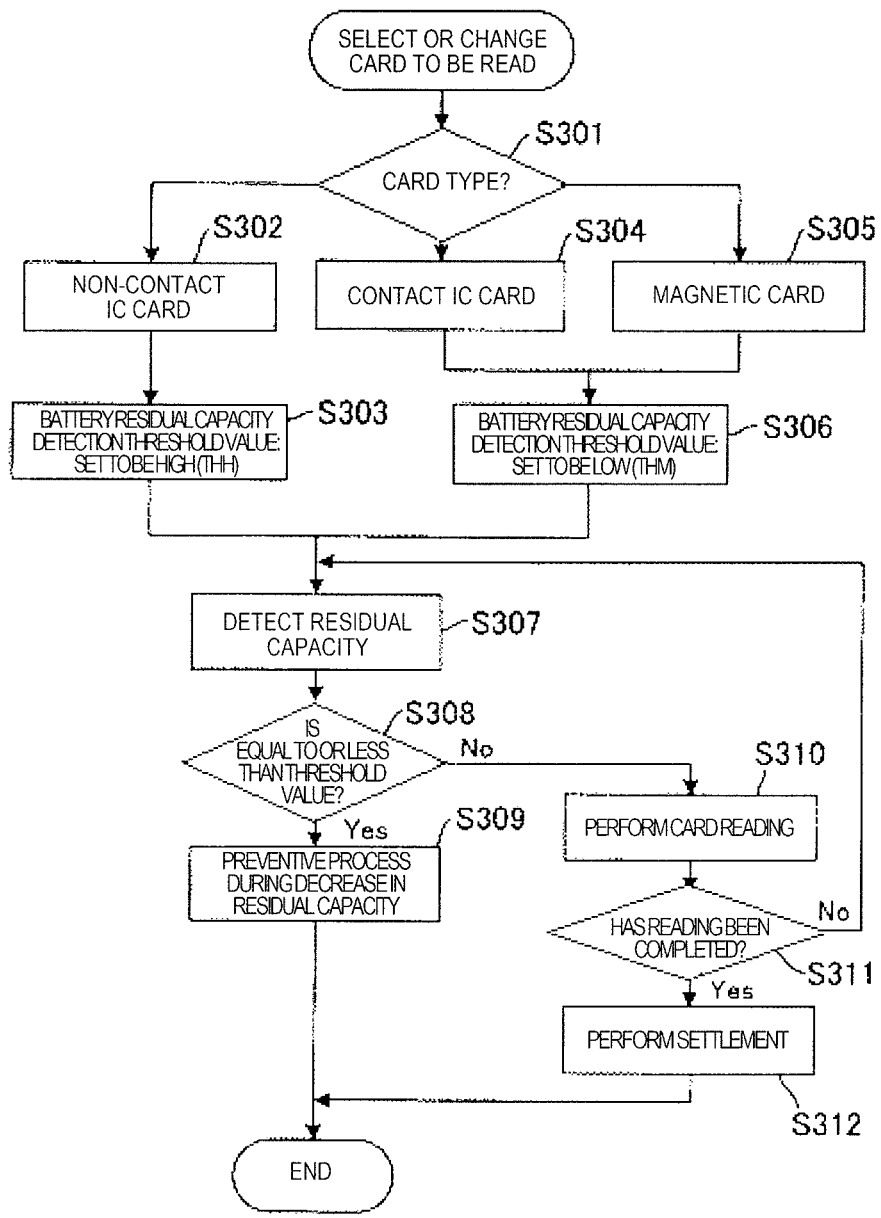
FIG. 3 is a diagram showing an example of a settlement process flow in a settlement terminal device according to a first exemplary embodiment.

FIG. 3 is a diagram showing an example of a settlement process flow in a settlement terminal device according to a first exemplary embodiment. The first exemplary embodiment is a first example of an operation of changing a battery management operation depending on a card type which is used for settlement.

Settlement terminal device 1 executes a settlement application, not shown in the drawing, which is installed in information processing unit 2 (see FIGS. 1A and 1B and FIG. 2) to start a settlement procedure. When a card to be read is selected or changed, information processing unit 2 of settlement terminal device 1 determines a card type used for settlement (step S301). The card type is instructed by causing a user of settlement terminal device 1 to perform selection and an input using touch panel 10 or keys 13, for example, when starting a settlement process. Information processing unit 2 may determine a card type according to from which one of magnetic card reader unit 36, non-contact IC card reader and writer unit 43, and contact IC card reader unit 44 card information is input.

When the card type is a non-contact IC card (step S302) according to the determination result of the card type in step S301, information processing unit 2 sets a battery residual capacity detection threshold value to be high (THH, see FIG. 4) (step S303).

On the other hand, when the card type is a contact IC card (step S304) according to the determination result of the card type in step S301 or when the card type is a magnetic card (step S305), information processing unit 2 sets a battery residual capacity detection threshold value to be low (THM, see FIG. 4) (step S305). A battery residual capacity detection threshold value may be set to a different value for each of a case where the card type is a contact IC card and a case where the card type is a magnetic card. For example, when the card type is a contact IC card, a battery residual capacity detection threshold value may be set to medium (THM, see FIG. 4). When the card type is a magnetic card, a battery residual capacity detection threshold value may be set to be low (THL, see FIG. 4).

Figure 4:
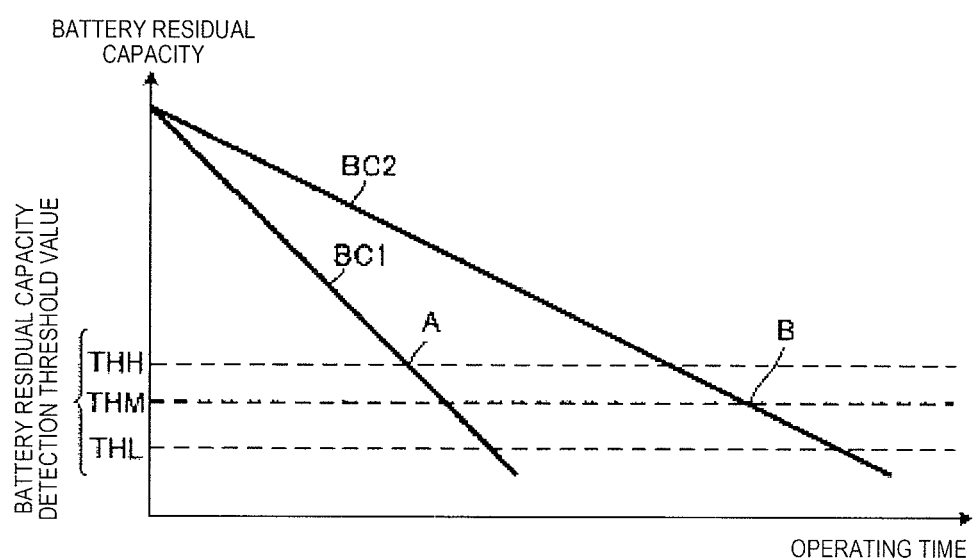
FIG. 4 is a diagram showing an example of battery residual capacity characteristics and detection threshold value setting in the settlement terminal device according to the first exemplary embodiment.

FIG. 4 is a diagram showing an example of battery residual capacity characteristics and detection threshold value setting in the settlement terminal device according to the first exemplary embodiment. FIG. 4 shows an example in which three setting values of THH, THM, and THL are specified as battery residual capacity detection threshold values. The battery residual capacity detection threshold values are set to values used as triggers for performing a preventive process when a battery residual capacity is decreased in a case where a power supply voltage or a battery terminal voltage of the device falls within an operable power supply voltage range or an operation guaranteed power supply voltage range of the device and before the power supply voltage or the battery terminal voltage falls below the operable power supply voltage or the operation guaranteed power supply voltage.

In a flow of FIG. 3, the battery residual capacity detection threshold value is set to THH in a case of a high threshold value and is set to THM in a case of a low threshold value. In addition, THL is provided on the assumption that a lower power consumption state, such as during the stand-by of a settlement process, is set. The battery residual capacity detection threshold value may be set to THL in a case of a low threshold value.

As shown in FIG. 4, a case where a process with large power consumption such as a settlement process using a non-contact IC card is performed results in battery residual capacity curve BC1 having characteristics which have a trend of rapid decrease in battery residual capacity. In this case, the battery residual capacity detection threshold value is set to a high THH, and thus it is possible to detect that the battery residual capacity is lower than a required capacity at an early timing indicated by A in FIG. 4 and to reliably perform a preventive process when there is a decreased residual capacity.

On the other hand, a case where a process with power consumption smaller than that in a case of the non-contact IC card, such as a settlement process using a contact IC card or a magnetic card, is performed results in battery residual capacity curve BC2 having characteristics which have a trend of little decrease in battery residual capacity. In this case, the battery residual capacity detection threshold value is set to a low THM, and thus it is possible to detect that the battery residual capacity is lower than a required capacity at a late timing indicated by B in FIG. 4 and to secure a long operating time of the device.

Referring back to FIG. 3, after the battery residual capacity detection threshold value is set, information processing unit 2 monitors a power supply voltage of an output of power supply unit 37 and detects the residual capacity of battery 38 (step S307). Then, information processing unit 2 determines whether the detected residual capacity is equal to or less than a detection threshold value (step S308). When the detected residual capacity is equal to or less than the battery residual capacity detection threshold value, information processing unit 2 performs a preventive process when there is a decreased residual capacity (step S309).

As the preventive process when there is a decreased residual capacity, a settlement process such as, for example, the reading of card information is stopped, a message such as "the settlement process will be stopped due to a low battery residual capacity" is displayed on the display unit of touch panel 10, and a user is given a notification and warning. In addition, a message such as "please charge" is displayed on the display unit of touch panel 10 so as to draw the user's attention and cause the user to charge battery 38. Thereby, it is possible to prevent the settlement process from being stopped due to battery exhaustion. Then, the settlement process flow is terminated.

In the process of determining a battery residual capacity of step S308, when the residual capacity of battery 38 is greater than the detection threshold value, information processing unit 2 performs card reading (step S310). In addition, information processing unit 2 determines whether or not the reading of card information has been terminated (step S311). When the reading has not been terminated, the process returns to step S307, and the detection and determination of the battery residual capacity are repeated until the reading of card information is terminated. When the reading of card information is terminated, information processing unit 2 performs a settlement procedure (step S312). In this case, it is possible to reliably perform the settlement process by monitoring the battery residual capacity until the reading of card information is terminated.

As the settlement procedure, the authentication of a card, the collation of card user information (PIN and the like), the transmission and reception of the settlement amount, and the like are performed. For example, when the settlement amount is a small amount of money which is less than a predetermined value, an offline settlement is performed in which settlement terminal device 1 independently performs settlement. In addition, when the settlement amount is a large amount of money which is equal to or greater than the predetermined value, an online settlement is performed in which settlement is performed by communicating with an external settlement center using wide area wireless communication unit 24 or local wireless communication unit 22. When the settlement procedure is terminated, information processing unit 2 terminates the settlement process flow.

According to this exemplary embodiment, it is possible to perform a settlement process by operating a magnetic card or a contact IC card which has become widespread because of power consumption smaller than that of a non-contact IC card. For this reason, it is possible to perform the settlement process for a long period of time to the utmost battery power storage amount. In addition, it is possible to reliably perform a settlement process using a non-contact IC card with large power consumption without causing battery exhaustion in the middle of the settlement process.

Second Exemplary Embodiment

Figure 5:
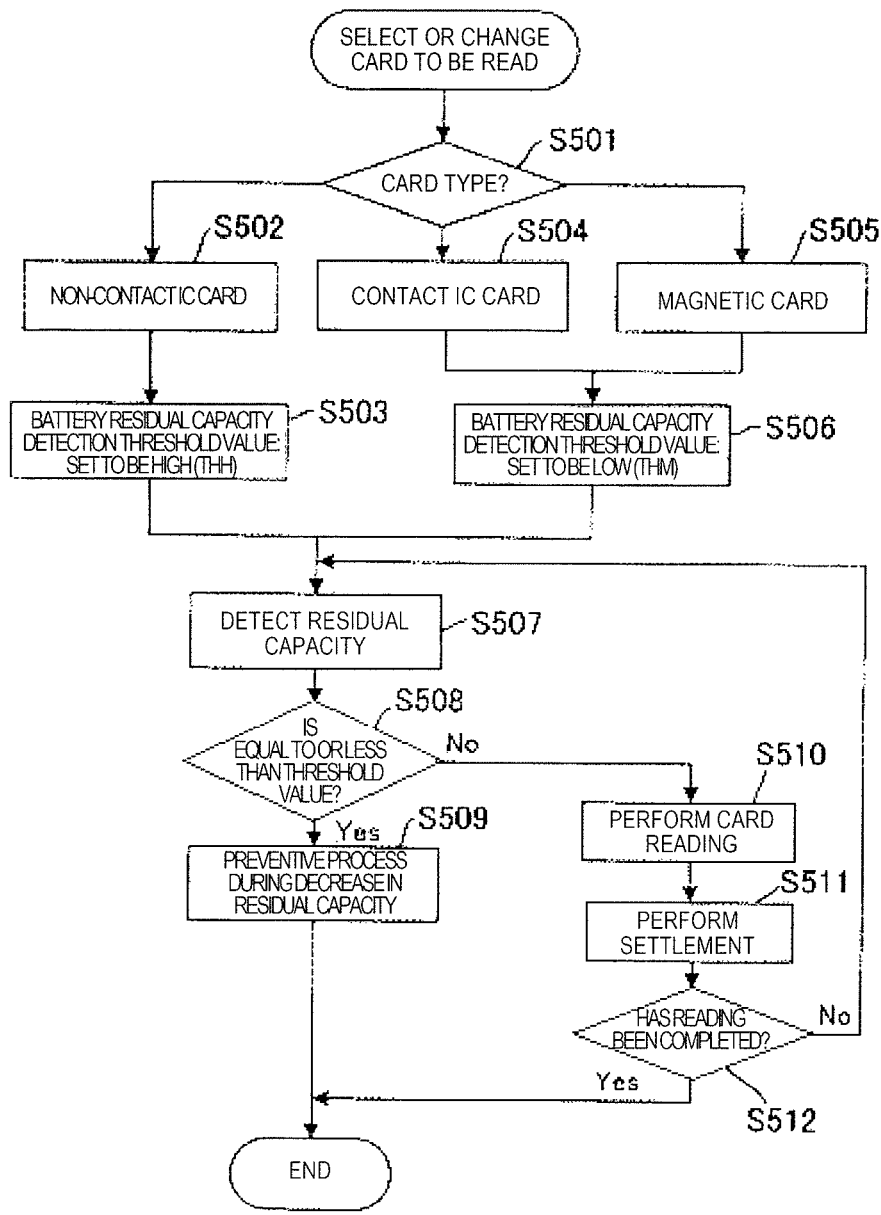
FIG. 5 is a diagram showing an example of a settlement process flow in a settlement terminal device according to a second exemplary embodiment.

FIG. 5 is a diagram showing an example of a settlement process flow in a settlement terminal device according to a second exemplary embodiment. The second exemplary embodiment is a second example of an operation of changing a battery management operation depending on a card type which is used for settlement.

Processes from a card type determination process of step S501 to a process of determining a battery residual capacity of step S508 and a preventive process when a residual capacity is decreased of step S509 are the same as the respective processes of the above-described first exemplary embodiment (FIG. 3). A description of the same processes will be omitted here.

In the process of determining a battery residual capacity of step S508, when a residual capacity of battery 38 is greater than a detection threshold value, information processing unit 2 performs card reading (step S510). Then, information processing unit 2 performs a settlement procedure (step S511) and determines whether or not the reading of card information and the settlement procedure have been terminated (step S512). When the reading and the settlement have not been terminated, the process returns to step S507, and the detection and determination of the battery residual capacity are repeated until the reading of card information and the settlement procedure are terminated. In this case, the battery residual capacity is monitored until the reading of card information and the settlement procedure are terminated, and thus it is possible to more reliably perform a settlement process. When the settlement procedure is terminated, information processing unit 2 terminates the settlement process flow.

According to this exemplary embodiment, similarly to the first exemplary embodiment, it is possible to perform an appropriate battery management in response to a card type of each of a non-contact IC card, a magnetic card, and a contact IC card. With regard to the magnetic card and contact IC card with small power consumption, it is possible to perform a settlement process for a long period of time by utilizing a battery power storage amount to the maximum. With regard to the non-contact IC card with large power consumption, it is possible to perform settlement in a state where a battery residual capacity is sufficient and to reliably perform a settlement process.

Third Exemplary Embodiment

Figure 6:
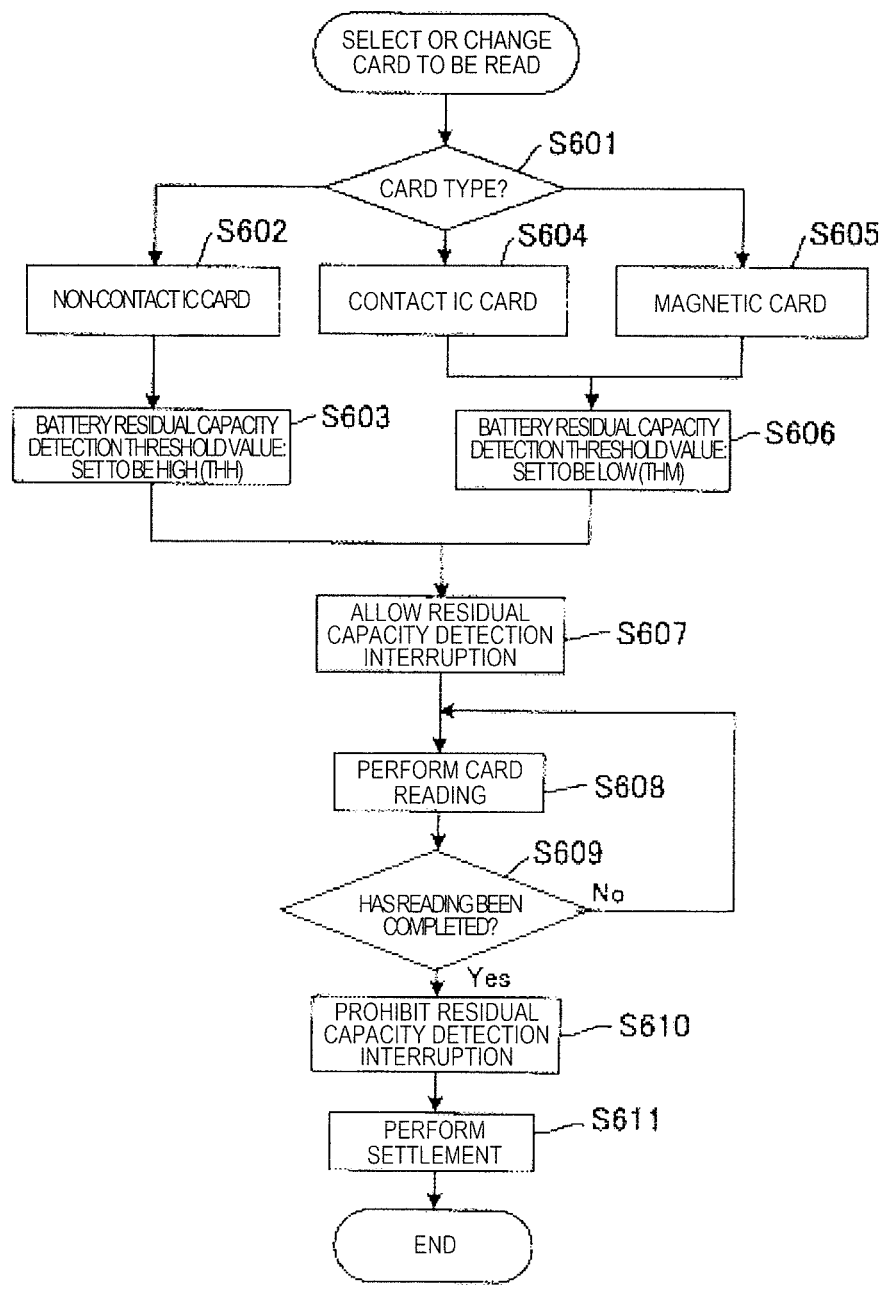
FIG. 6 is a diagram showing an example of a settlement process flow in a settlement terminal device according to a third exemplary embodiment.
Figure 7:
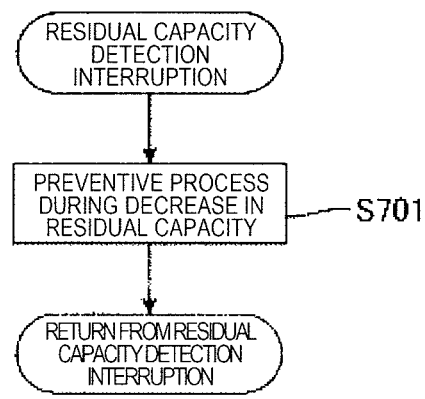
FIG. 7 is a diagram showing an example of a residual capacity detection interruption process flow in the settlement terminal device according to the third exemplary embodiment.

FIG. 6 is a diagram showing an example of a settlement process flow in a settlement terminal device according to a third exemplary embodiment. FIG. 7 is a diagram showing an example of a residual capacity detection interruption process flow in the settlement terminal device according to the third exemplary embodiment. The third exemplary embodiment is a third example of an operation of changing a battery management operation depending on a card type which is used for settlement.

Processes from a card type determination process of step S601 shown in FIG. 6 to a process of setting a battery residual capacity detection threshold value of step S603 and step S606 are the same as the respective processes of the above-described first exemplary embodiment (FIG. 3). A description of the same processes will be omitted here.

After a battery residual capacity detection threshold value is set to be high (THH) in a case of a non-contact IC card and a battery residual capacity detection threshold value is set to be low (THM) in a case of a contact IC card or a magnetic card, information processing unit 2 allows residual capacity detection interruption of a battery (step S607). Then, information processing unit 2 performs card reading (step S608).

Information processing unit 2 detects a residual capacity of battery 38 and performs the allowed residual capacity detection interruption processing when the detected residual capacity is equal to or less than a detection threshold value. As shown in FIG. 7, in a residual capacity detection interruption process, a preventive process when there is a decreased residual capacity is performed (step S701). The preventive process during a decrease in a residual capacity is the same as that of step S309 of the above-described first exemplary embodiment (FIG. 3), and includes a process of displaying a state where a battery residual capacity is decreased, a process of stopping reading card information, and the like.

Subsequently, information processing unit 2 determines whether or not the reading of card information has been terminated (step S609). When the reading has not been terminated, the process returns to step S608, and the information processing unit stands by until the reading of card information is terminated. When the reading of card information is terminated, information processing unit 2 prohibits the residual capacity detection interruption of the battery (step S610). Then, information processing unit 2 performs a settlement procedure (step S611). When the residual capacity detection interruption of the battery has not been prohibited at the time of performing settlement, there is the possibility of the settlement process being stopped or causing an error when the shortage of the battery residual capacity is detected while the settlement or the operation of the residual capacity detection becomes unstable. In order to prevent such a situation from occurring, the battery residual capacity detection threshold value is set to be able to secure sufficient power until information processing unit 2 completes the settlement process. In this case, the battery residual capacity is monitored until the reading of card information is terminated, and thus it is possible to reliably perform the settlement process. When the settlement procedure is terminated, information processing unit 2 terminates the settlement process flow.

Meanwhile, similarly to the second exemplary embodiment shown in FIG. 5, even when the settlement procedure of step S611 is performed before the reading of step S609 is terminated after the card reading of step S608 is started, the settlement procedure can be performed similarly.

According to this exemplary embodiment, similarly to the first and second embodiments, it is possible to perform an appropriate battery management in response to a card type of each of a non-contact IC card, a magnetic card, and a contact IC card.

Fourth Exemplary Embodiment

Figure 8:
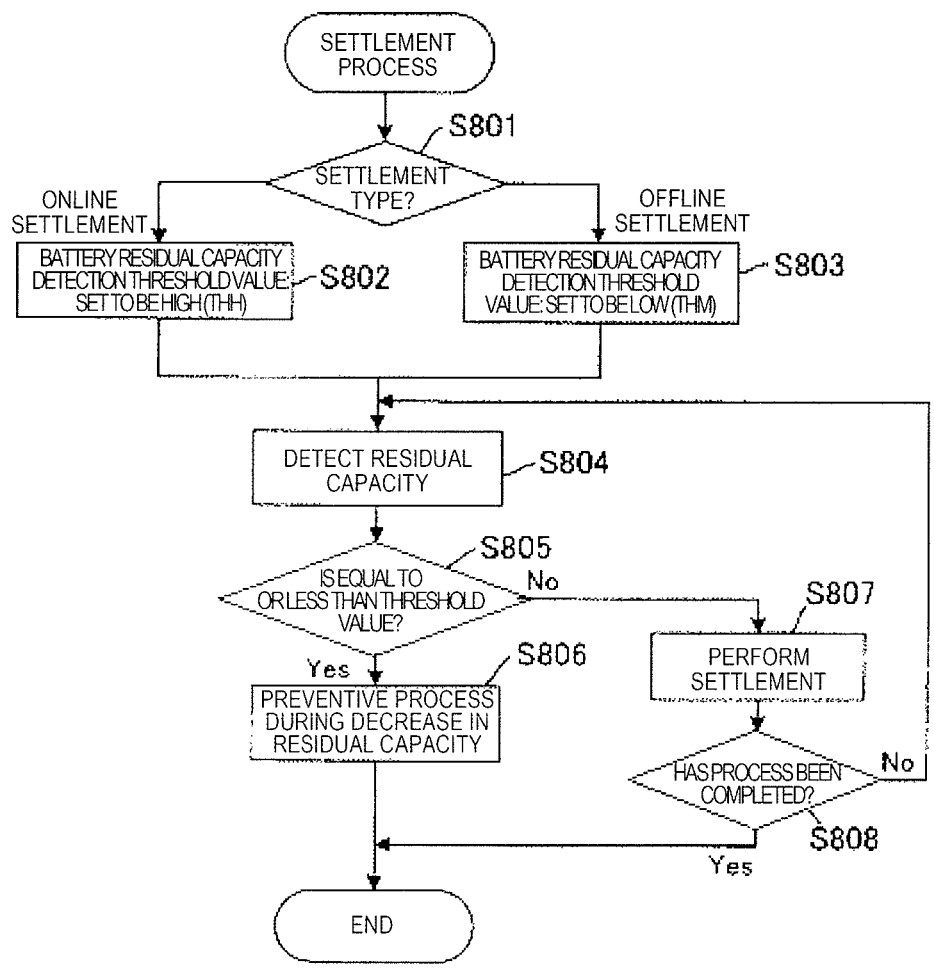
FIG. 8 is a diagram showing an example of a settlement process flow in a settlement terminal device according to a fourth exemplary embodiment.

FIG. 8 is a diagram showing an example of a settlement process flow in a settlement terminal device according to a fourth exemplary embodiment. The fourth exemplary embodiment is an example of an operation of changing a battery management operation according to whether the type of settlement is an online settlement communicating with an external settlement center or the like or is an offline settlement in which the device independently completes a settlement process.

A settlement terminal device 1 executes a settlement application, not shown in the drawing, which is installed in information processing unit 2 (see FIGS. 1A and 1B and FIG. 2) to thereby start a settlement procedure. In a settlement process, information processing unit 2 of settlement terminal device 1 determines a settlement type (step S801). The settlement type is determined by information processing unit 2 depending on an amount of money for performing settlement. When the settlement amount is a larger amount of money than a predetermined value, it is determined that an online settlement is performed. When the settlement amount is a smaller amount of money than the predetermined value, it is determined that an offline settlement is performed. The settlement type may be determined depending on a card type regarding whether or not a card to be used is a magnetic card or an IC card, an attribute of a card issuing source, an attribute of a card user, and the like.

When the settlement type is an online settlement according to the determination result of the settlement type in step S801, information processing unit 2 sets a battery residual capacity detection threshold value to be high (THH, see FIG. 4) (step S802). On the other hand, when the settlement type is an offline settlement, information processing unit 2 sets a battery residual capacity detection threshold value to be low (THM, see FIG. 4) (step S803).

In the online settlement, communication with the outside is performed during a settlement process, and thus power consumption is large. This results in battery residual capacity curve BC1, shown in FIG. 4, having characteristics which have a trend of rapid decrease in battery residual capacity. In this case, the battery residual capacity detection threshold value is set to a high THH, and thus it is possible to detect that the battery residual capacity is lower than a required capacity at an early timing indicated by A in FIG. 4 and to reliably perform a preventive process when there is a decreased residual capacity.

On the other hand, in the offline settlement, settlement terminal device 1 independently performs the process without communicating with the outside, and thus power consumption is smaller than that in a case of the online settlement. This results in battery residual capacity curve BC2, shown in FIG. 4, having characteristics which have a trend of little decrease in battery residual capacity. In this case, the battery residual capacity detection threshold value is set to a low THM, and thus it is possible to detect that the battery residual capacity is lower than a required capacity at a late timing indicated by B in FIG. 4 and to secure a long operating time of the device.

After the battery residual capacity detection threshold value is set, information processing unit 2 monitors a power supply voltage of an output of power supply unit 37 and detects a residual capacity of battery 38 (step S804). Then, information processing unit 2 determines whether the detected residual capacity is equal to or less than a detection threshold value (step S805). When the detected residual capacity is equal to or less than the battery residual capacity detection threshold value, information processing unit 2 performs a preventive process during a decrease in a residual capacity (step S806). The preventive process during a decrease in a residual capacity is the same as that of step S309 of the above-described first exemplary embodiment (FIG. 3), and includes a process of displaying a state where a battery residual capacity is decreased, a process of stopping reading card information, and the like.

In the process of determining a battery residual capacity of step S805, when the residual capacity of battery 38 is greater than the detection threshold value, information processing unit 2 performs card reading and a settlement procedure (step S807). Then, information processing unit 2 determines whether or not the settlement procedure has been terminated (step S808). When the settlement procedure has not been terminated, the process returns to step S804, and the detection and determination of a battery residual capacity are repeated until the settlement procedure is terminated. When the settlement procedure is terminated, information processing unit 2 terminates the settlement process flow. In this case, it is possible to reliably perform the settlement process by monitoring the battery residual capacity until the settlement procedure is terminated.

Meanwhile, similarly to the third exemplary embodiment shown in FIGS. 6 and 7, it is possible to similarly perform a settlement process flow having battery management functions corresponding to a plurality of settlement types through two tasks using a residual capacity detection interruption process.

According to this exemplary embodiment, it is possible to perform an appropriate battery management in response to a settlement type of each of an online settlement and an offline settlement. In a case of an offline settlement having low power consumption because wireless communication is not performed during a settlement process, it is possible to perform a settlement process for a long period of time by utilizing a battery power storage amount to the maximum. In a case of an online settlement having large power consumption because wireless communication with the outside is performed during a settlement process, it is possible to perform settlement in a state where a battery residual capacity is sufficient without causing battery exhaustion in the middle of a settlement process and to reliably perform the settlement process.

Fifth Exemplary Embodiment

Figure 9:
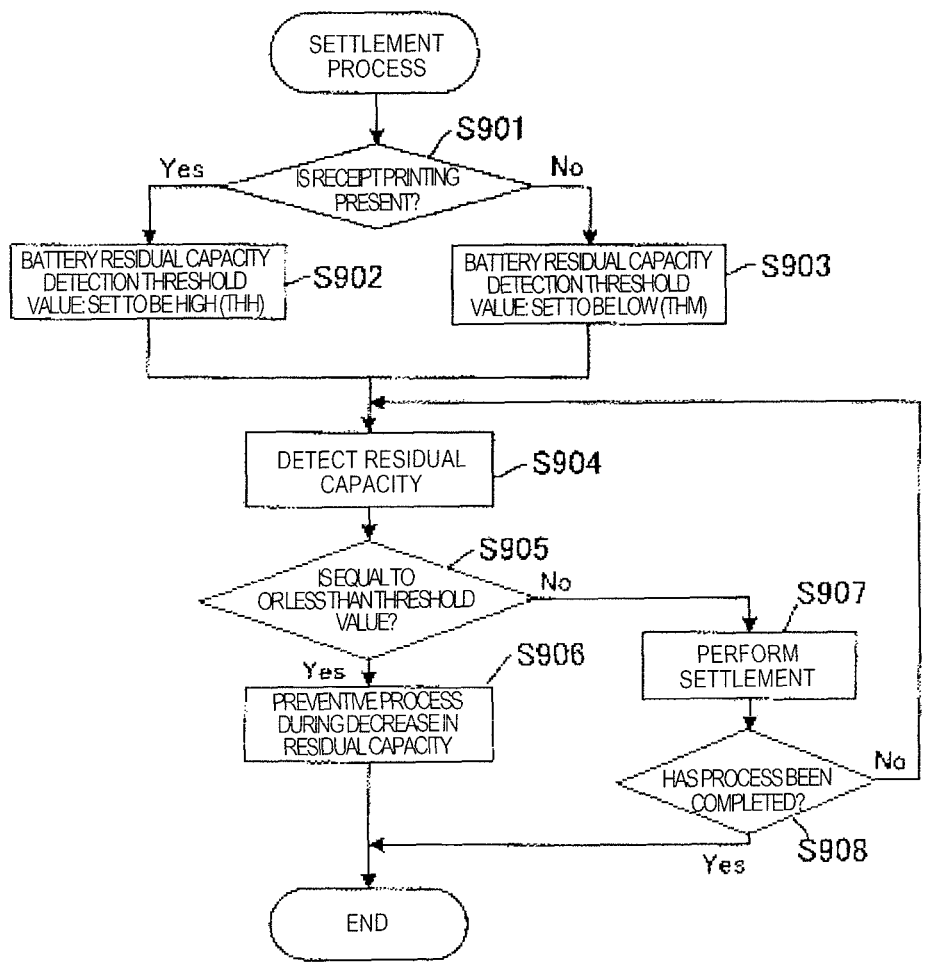
FIG. 9 is a diagram showing an example of a settlement process flow in a settlement terminal device according to a fifth exemplary embodiment.

FIG. 9 is a diagram showing an example of a settlement process flow in a settlement terminal device according to a fifth exemplary embodiment. The fifth exemplary embodiment is an example of an operation of changing a battery management operation depending on the presence or absence of receipt printing during a settlement process.

A settlement terminal device 1 executes a settlement application, not shown in the drawing, which is installed in information processing unit 2 (see FIGS. 1A and 1B and FIG. 2) to thereby start a settlement procedure. In the settlement process, information processing unit 2 of settlement terminal device 1 determines the presence or absence of receipt printing (step S901). With regard to the presence or absence of receipt printing, for example, information processing unit 2 determines whether to perform a printing operation on the basis of setting information of the device. Meanwhile, when the settlement process is started, the presence or absence of receipt printing may be instructed by causing a user of settlement terminal device 1 to perform selection and an input using touch panel 10 or keys 13.

When the receipt printing is performed according to the determination result of the presence or absence of receipt printing in step S901, information processing unit 2 sets a battery residual capacity detection threshold value to be high (THH, see FIG. 4) (step S902). On the other hand, when the receipt printing is not performed, information processing unit 2 sets a battery residual capacity detection threshold value to be low (THM, see FIG. 4) (step S903).

When the receipt printing is performed, large power consumption is required in order to perform an operation of a print head when driving printing unit 35 and to feed paper. This results in battery residual capacity curve BC1, shown in FIG. 4, having characteristics which have a trend of rapid decrease in battery residual capacity. In this case, the battery residual capacity detection threshold value is set to a high THH, and thus it is possible to detect that the battery residual capacity is lower than a required capacity at an early timing indicated by A in FIG. 4 and to reliably perform a preventive process when there is a decreased residual capacity.

On the other hand, when the receipt printing is not performed, power consumption is low because printing unit 35 is not driven. This results in battery residual capacity curve BC2, shown in FIG. 4, having characteristics which have a trend of little decrease in battery residual capacity. In this case, the battery residual capacity detection threshold value is set to a low THM, and thus it is possible to detect that the battery residual capacity is lower than a required capacity at a late timing indicated by B in FIG. 4 and to secure a long operating time of the device.

After the battery residual capacity detection threshold value is set, information processing unit 2 monitors a power supply voltage of an output of power supply unit 37 and detects a residual capacity of battery 38 (step S904). Then, information processing unit 2 determines whether the detected residual capacity is equal to or less than a detection threshold value (step S905). When the detected residual capacity is equal to or less than the battery residual capacity detection threshold value, information processing unit 2 performs a preventive process during a decrease in a residual capacity (step S906). The preventive process during a decrease in a residual capacity is the same as that of step S309 of the above-described first exemplary embodiment (FIG. 3), and includes a process of displaying a state where a battery residual capacity is decreased, a process of stopping reading card information, and the like.

In the process of determining a battery residual capacity of step S905, when the residual capacity of battery 38 is greater than the detection threshold value, information processing unit 2 performs card reading and a settlement procedure (step S907). Then, information processing unit 2 determines whether or not the settlement procedure has been terminated (step S908). When the settlement procedure has not been terminated, the process returns to step S904, and the detection and determination of a battery residual capacity are repeated until the settlement procedure is terminated. When the settlement procedure is terminated, information processing unit 2 terminates the settlement process flow. In this case, it is possible to reliably perform the settlement process by monitoring the battery residual capacity until the settlement procedure is terminated.

Meanwhile, similarly to the third exemplary embodiment shown in FIGS. 6 and 7, it is possible to similarly perform a settlement process flow having battery management functions corresponding to the presence or absence of receipt printing through two tasks using a residual capacity detection interruption process.

According to this exemplary embodiment, it is possible to perform an appropriate battery management in response to the presence or absence of receipt printing. When the receipt printing is not performed, it is possible to perform a settlement process for a long period of time by utilizing a battery power storage amount to the maximum. In addition, when receipt printing requiring large power consumption is performed, it is possible to perform settlement in a state where a battery residual capacity is sufficient without causing battery exhaustion in the middle of a settlement process and to reliably perform the settlement process.

Sixth Exemplary Embodiment

Figure 10:
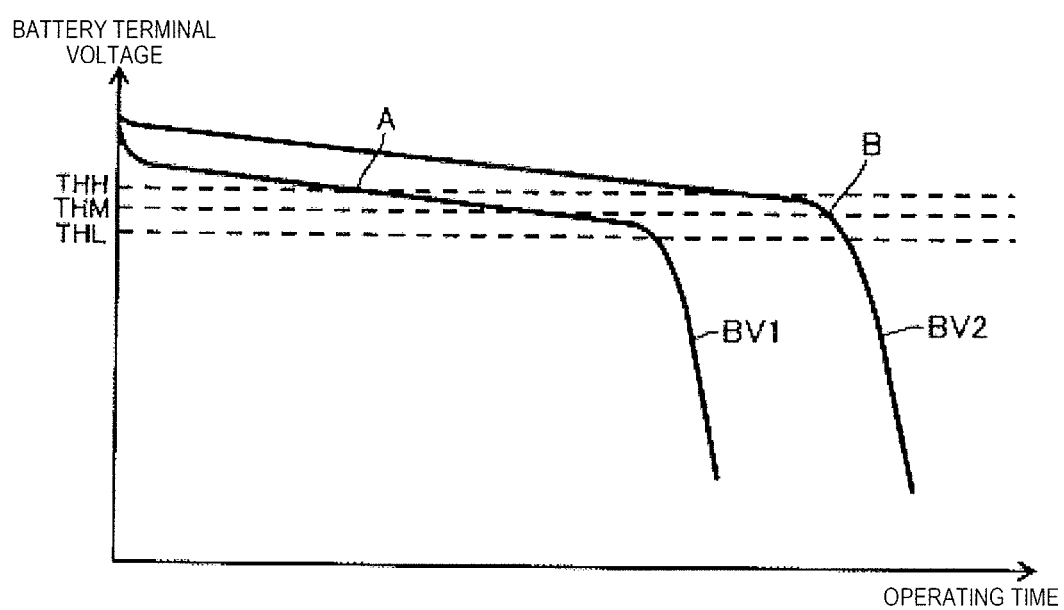
FIG. 10 is a diagram showing an example of battery terminal voltage characteristics and detection threshold value setting in a settlement terminal device according to a sixth exemplary embodiment.

FIG. 10 is a diagram showing an example of battery terminal voltage characteristics and detection threshold value setting in a settlement terminal device according to a sixth exemplary embodiment. The sixth exemplary embodiment is an example of a case where a detection threshold value of a battery terminal voltage is set instead of setting a detection threshold value of a battery residual capacity in determining the battery residual capacity.

In FIG. 10, an example is shown in which three setting values of THH, THM, and THL are specified as battery terminal voltage detection threshold values instead of setting a detection threshold value for battery residual capacity characteristics shown in FIG. 4. The battery residual capacity detection threshold values are set to values used as triggers for performing a preventive process when a battery residual capacity is decreased in a case where a power supply voltage or a battery terminal voltage of the device falls within an operable power supply voltage range or an operation guaranteed power supply voltage range of the device and before the power supply voltage or the battery terminal voltage falls below the operable power supply voltage or the operation guaranteed power supply voltage.

In the flow of FIG. 3, the battery terminal voltage detection threshold value is set to THH in a case of a high threshold value and is set to THM in a case of a low threshold value. In addition, THL is provided on the assumption that a lower power consumption state, such as during the stand-by of a settlement process, is set. The battery residual capacity detection threshold value may be set to THL in a case of a low threshold value.

As shown in FIG. 10, a case where a process with large power consumption, such as a settlement process using a non-contact IC card, an online settlement process, or a case where receipt printing is present during settlement, is performed results in a battery terminal voltage curve BV1 having characteristics which have a trend of rapid decrease in battery residual capacity. In this case, the battery residual capacity detection threshold value is set to a high THH, and thus it is possible to detect that the battery residual capacity is lower than a required capacity at an early timing indicated by A in FIG. 10 and to reliably perform a preventive process when there is a decreased residual capacity.

On the other hand, a case where a process with smaller power consumption, such as a settlement process using a contact IC card or a magnetic card, an offline settlement process, or a case where receipt printing is not present during settlement, is performed results in battery terminal voltage curve BV2 having characteristics which have a trend of little decrease in battery residual capacity. In this case, the battery terminal voltage detection threshold value is set to a low THM, and thus it is possible to detect that the battery residual capacity is lower than a required capacity at a late timing indicated by B in FIG. 10 and to secure a long operating time of the device.

As in this exemplary embodiment, even in a case where a detection threshold value of a battery terminal voltage is used, it is possible to similarly determine a battery residual capacity.

Seventh Exemplary Embodiment

A seventh exemplary embodiment is an example of providing detection threshold values (H, M, . . . , L) for determining a battery residual capacity in accordance with a combination of a plurality of types of settlement mode having different power consumption levels such as the above-mentioned card types (non-contact IC card/contact IC card/magnetic card), settlement types for each of which the necessity of external communication is different (online settlement/offline settlement), and an operation (presence/absence) of receipt printing. As the detection threshold value, a battery residual capacity detection threshold value is used as in the first exemplary embodiment, but a battery terminal voltage detection threshold value may be used as in the sixth exemplary embodiment.

In this manner, a detection threshold value for determining each battery residual capacity is set in accordance with a combination of a plurality of types of settlement mode. Thereby, similarly to the first to sixth embodiments, it is possible to perform an appropriate battery management corresponding to power consumption at the time of performing settlement using various types of settlement mode. In the seventh exemplary embodiment, a more appropriate operating time is obtained for each combination of various settlement modes.

The present invention can also be expressed as an information processing apparatus as an apparatus or a program for causing the information processing apparatus to operate as a computer. Further, the present invention can also be expressed as an information processing method including operations (steps) performed by the information processing apparatus. In addition, the present invention can also be expressed as a storage medium having recorded thereon a program for operating the information processing apparatus. That is, the present invention can also be expressed in any category among an apparatus, a method, a program, and a storage medium having the program recorded thereon.

Various examples have been described so far with reference to the accompanying drawings, but the present invention is not limited to the examples. It is obvious to those skilled in the art that various modified or revised examples may be made in the range disclosed in claims, and these modified or revised examples are included in the technical scope of the invention. In addition, components in the above-described embodiments may be arbitrarily combined with each other without departing from the scope of the invention.

What is claimed is:

1. A settlement terminal device, comprising:
a processor that performs a settlement process, the settlement process configured to be performed according to a first settlement mode and a second settlement mode; and
a power supply that supplies power stored in a battery to the processor,
wherein the processor sets a first detection threshold value for the first settlement mode requiring a first power consumption level, and sets a second detection threshold value for the second settlement mode requiring a second power consumption level which is lower than the first power consumption level, the first detection threshold value being greater than the second detection threshold value,
the processor detects a state where a battery residual capacity is equal to or less than the first detection threshold value when performing the settlement process according to the first settlement mode, and
the processor detects the state where the battery residual capacity is equal to or less than the second detection threshold value when performing the settlement process according to the second settlement mode.

2. The settlement terminal device of claim 1, wherein the processor changes a detection threshold value of the battery residual capacity in response to a plurality of settlement modes having different power consumption levels.

3. The settlement terminal device of claim 2, wherein the processor changes a detection threshold value of the battery residual capacity depending on a card type which is used for the settlement process as the plurality of settlement modes having the different power consumption levels.

4. The settlement terminal device of claim 3, wherein the second settlement mode requiring the second power consumption level processes a contact IC card.

5. The settlement terminal device of claim 3, wherein a magnetic card is processed in the second settlement mode requiring the second power consumption level.

6. The settlement terminal device of claim 3, wherein a non-contact IC card is processed in the first settlement mode requiring the first power consumption level.

7. The settlement terminal device of claim 2, wherein the processor includes settlement modes regarding whether or not external communication during the settlement process is necessary, as the plurality of settlement modes having the different power consumption levels.

8. The settlement terminal device of claim 2, wherein the processor includes settlement modes regarding whether to perform receipt printing during the settlement process, as the plurality of settlement modes having the different power consumption levels.

9. The settlement terminal device of claim 1, wherein, when the state where the battery residual capacity is equal to or less than one of the first detection threshold value and the second detection threshold value is detected before the settlement process is completed, the processor performs a preventive process.

10. The settlement terminal device of claim 1, wherein the processor is configured to perform the settlement process according to each of the first settlement mode and the second settlement mode when the power stored in the battery is greater than each of the first detection threshold value and the second detection threshold value.

11. The settlement terminal device of claim 1, wherein the processor is configured to not perform the settlement process according to the first settlement mode and configured to perform the settlement process according to the second settlement mode when the power stored in the battery is not greater than the first detection threshold value and greater than the second detection threshold value.

12. The settlement terminal device of claim 1, further comprising:
an input that receives an instruction for performing the settlement process according to the one of the first settlement mode and the second settlement mode,
wherein the processor determines whether the instruction is for performing the settlement process according to the one of the first settlement process and the second settlement process based on the instruction.

13. The settlement terminal device of claim 1, wherein the processor is configured to perform, during the settlement process, a settlement procedure including at least one of an authentication process, a collation process, and a transmission process of an amount of the settlement process when the power stored in the battery is greater than the corresponding one of the first detection threshold value and the second detection threshold value.

14. The settlement terminal device of claim 13, wherein, when the settlement procedure includes the transmission process, the processor is configured to change a method of the settlement procedure depending on the amount of the settlement process.

15. The settlement terminal device of claim 14, wherein, when the settlement procedure includes the transmission process, the processor is configured to perform the settlement process in an online state when the amount of the settlement process is greater than a predetermined value, and perform the settlement process in an offline state when the amount of the settlement process is smaller than the predetermined value.

16. The settlement terminal device of claim 1, wherein
the processor determines whether the settlement process includes a receipt printing process, and
the processor is configured set a detection threshold value of the battery residual capacity to be higher when the settlement process includes the receipt printing process than when the settlement process does not include the receipt printing process.

17. The settlement terminal device of claim 1, wherein
the processor is configured to perform the settlement process in an online state when the amount of the settlement process is greater than a predetermined value, and perform the settlement process in an offline state when the amount of the settlement process is smaller than the predetermined value, and
the processor is configured to set a detection threshold value of the battery residual capacity to be higher when the settlement process is to be performed in the online state than when the settlement process is to be performed in the offline state.

18. A settlement process method using a settlement process apparatus, the settlement process method comprising:
causing a processor performing a settlement process in the settlement process apparatus to:
set a first detection threshold value for a first settlement mode requiring a first power consumption level, and set a second detection threshold value for a second settlement mode requiring a second power consumption level which is lower than the first power consumption level;
determine whether the settlement process is to be performed according to one of the first settlement mode and the second settlement mode; and
detect a state where a battery residual capacity serving as a power supply of the settlement process apparatus is equal to or less than the first detection threshold value when the settlement process is performed according to the first settlement mode, and detect the state where the battery residual capacity serving as the power supply of the settlement process apparatus is equal to or less than the first detection threshold value when the settlement process is performed according to the first settlement mode.

19. The method of claim 18, wherein the processor is further caused to perform:
changing a detection threshold value of the battery residual capacity in response to a plurality of settlement modes having different power consumption levels.

20. A settlement terminal device, comprising:
a memory that stores a first detection threshold value for a first settlement mode and a second detection threshold value for a second settlement mode, the first detection threshold value being greater than the second detection threshold value;
at least one card reader that reads settlement information from a plurality of settlement card types, the first settlement mode corresponding to a first card type of the plurality of settlement card types, the second settlement mode corresponding to a second card type of the plurality of settlement card types;
a power supply that supplies power stored in a battery for performing a settlement process, the settlement process configured to be performed according to the first settlement mode and the second settlement mode; and
a processor that receives a settlement instruction, determines whether the settlement instruction is for performing the settlement process according to one of the first settlement mode and the second settlement mode, determines whether the power stored in the battery is greater than the first detection threshold value when performing the settlement process according to the first settlement mode, and determines whether the power stored in the battery is greater than the second detection threshold value when performing the settlement process according to the second settlement mode.

* * * * *